United States Patent Office 2,880,051
Patented Mar. 31, 1959

2,880,051

GAS FADING RESISTANT TEXTILES

Leonard J. Rosen, East Orange, and Fred Fortess, Summit, N.J., assignors to Celanese Corporation of America, New York, N.Y., a corporation of Delaware No Drawing. Application October 20, 1953
Serial No. 387,323

8 Claims. (Cl. 8—61)

This invention relates to textile materials and is particularly concerned with textile materials having an improved resistance to gas fading.

In the coloration of textile materials it is very desirable that the colors produced on the materials be as fast as possible to light, washing, and to other agencies such as acid fumes. Many dyestuffs yield on organic derivative of cellulose and polyester textile materials desirable colors which are fast to light and washing, but these colors often suffer from a lack of fastness of acid fumes. When textile materials to which these dyestuffs have been applied are exposed to acid fumes, such as, for example, the products of combustion of coal, gas, etc., the color undergoes a change in shade. This change is usually referred to as gas fading. The change which occurs may be a dulling of the brightness of the shade in some instances and in other there may be a definite change in color. These undesirable effects are frequently observed in the case of many anthraquinone dyestuffs which yield valuable blue colors on these textile materials. When materials dyed with these colors are exposed to acid fumes the colors change from a pure blue shade to one having a reddish cast. On continued exposure to the acid fumes the blue color may even change to a pink color. Such changes obviously restrict the range of usefulness of these dyestuffs and the textile materials dyed therewith.

It is an important object of this invention to provide textile materials which will be free from the foregoing and other difficulties.

A further object of this invention is to provide textile materials of greatly improved resistance to gas fading.

Other objects of this invention will be apparent from the following detailed description and claims.

According to the present invention, it has been found that the gas fading resistance of textile materials having a base of organic derivatives of cellulose such as cellulose acetate, cellulose propionate, cellulose butyrate, cellulose acetate propionate, cellulose acetate butyrate, ethyl cellulose, benzyl cellulose and the like, or linear fiber-forming polyesters such as polyethylene terephthalate and the like may be greatly increased by incorporating into said materials an alkaline salt of a copolymer of an alkyl vinyl ether and an ethylene carboxylic acid, preferably an ethylene $\alpha,\beta$ dicarboxylic acid, its half-ester or its anhydride. Textile materials having said copolymer incorporated therein, when dyed, show little or no tendency or a greatly reduced tendency to change their shade or color on exposure to acid fumes even when said exposure is greatly prolonged and the dyestuffs employed are particularly sensitive to gas fading. As a result, the utility of said dyestuffs and textile materials is greatly increased.

Ethylene carboxylic acids that may be employed in producing the copolymers include, for example, acrylic acid and substituted acrylic acids, crotonic acid and substituted crotonic acids, and methacrylic acids.

The preferred ethylene $\alpha,\beta$ dicarboxylic acids and their half esters and anhydrides that are suitable for preparing the copolymers employed in carrying out this invention include, for example, maleic acid, fumaric acid, maleic anhydride, the mono-methyl, mono-ethyl or mono-propyl esters of maleic acid and the mono-methyl, mono-ethyl or mono-propyl esters of fumaric acid. The alkyl vinyl ethers with which these substances may be copolymerized include, for example, methyl vinyl ether, ethyl vinyl ether, propyl vinyl ether, butyl vinyl ether, isobutyl vinyl ether, pentyl vinyl ether and hexyl vinyl ether. Best results from the viewpoint of solubility in solvents commonly used for dissolving the base of the textile materials and freedom from precipitation owing to the formation of insoluble salts of metallic ions are obtained when the copolymer is prepared from maleic anhydride and an alkyl vinyl ether. Good results have been obtained when the copolymer contains equimolecular proportions of the two reactants. However, since the effectiveness of the copolymer is based on the molar proportion of the carboxylic acid, it is preferred to use copolymers containing a higher ratio of maleic anhydride. Since, as pointed out below, the copolymer may be incorporated in the spinning dope from which the textile materials are prepared, it is desirable to use a copolymer whose viscosity is relatively low to avoid an excessive increase of the viscosity of the spinning dope. While satisfactory results have been obtained using a copolymer having a specific viscosity of between about 0.3 and 3.0, it is preferred, when the copolymer is to be added to a spinning dope, to use a copolymer having a specific viscosity of less than about 1.5. All the specific viscosities referred to herein and in the appended claims are measured at 25° C. on a solution containing 1 gram of the copolymer in 100 milliliters of 2-butanone.

The copolymers are incorporated into the textile material so as to distribute them uniformly therein. For example, when the textile material is prepared by spinning a dope comprising a solution in a suitable solvent of the base from which the textile material is prepared, the copolymers are added directly to said dope. Another way in which the copolymer may be incorporated into the textile material when it is spun from a dope is to inject a relatively concentrated solution of the copolymer into the dope as it flows to the spinning operation. When, on the other hand, the textile material is prepared by a melt spinning process, for example, the copolymers are incorporated, in any suitable manner prior to the melt spinning operation, into the base from which the textile materials are prepared. The proportions of copolymer incorporated into the textile material may range from about 1 to 15% by weight, or preferably from about 2 to 6% by weight, based on the total weight of the textile material. Lower percentages of the copolymer will give less protection to the textile material against gas fading, but this protection may be adequate when the exposure conditions are not severe or when the dyestuffs themselves have a relatively good resistance to gas fading. Higher percentages of the copolymer will give more protection to the textile material even when the exposure conditions are severe and the dyestuffs are particularly sensitive to gas fading.

To convert the copolymer into its alkaline salt, the textile material having the copolymer incorporated therein is treated at some point in its production with an alkaline medium i.e. a medium having a pH above about 7.5 or preferably between about 8 and 9.5. In some cases, the base of the textile material may have therein a sufficient quantity of an alkaline reacting salt, such as magnesium acetate to convert the copolymer into its alkaline salt. Frequently, also, the dyebath employed for dyeing the textile material has or may be adjusted to have a pH above about 7.5 or preferably between about 8 and 9.5 so that the alkaline treatment of the textile material will take place concurrently with the dyeing thereof. If this is not possible, the baths employed for one of the finishing treatments following the dyeing, such as the soaping, may be made alkaline, i.e. brought to the pH specified above, to achieve the same result. When the textile materials are washed after use, the soaps employed for such washing normally have an alkaline reaction so that the gas fading resistance of the textile materials will be regenerated during each such washing. Alkaline reacting materials that may be reacted with the copolymer to form the alkaline salt of the copolymer include, for example, sodium potassium and magnesium carbonates, formates, acetates and propionates, tartrates, lactates, formates, stearates, benzoates and phosphates (pyro and meta). There may also be employed hydroxides, alkaline oxides, alcoholates, alkaline soaps and the like.

Textile materials are frequently given a resin or other finishing treatment to improve their handle, crease resistance, or the like. During many of these treatments there is applied to the textile materials an acidic substance which may, for example, serve as a catalyst for the polymerization of the applied resin or resin forming materials. It is important, in this case, in order to obtain a satisfactory degree of protection against gas fading to remove the acidic material, as by washing, or the like after the finishing treatment is complete.

The gas fading resistance of the textile materials of this invention is substantially permanent to washing and dry cleaning. In point of fact, as set forth above, washing will normally regenerate the gas fading resistance of the textile materials. This permanence to washing and dry cleaning is most surprising in that the copolymer is simply incorporated into the textile material and need not be polymerized in situ or be chemically linked to the base from which the textile materials are made which would require the use of catalysts and special after treatments.

The increase in resistance to gas fading imparted to the textile materials dyed with acetate or other dyestuffs sensitive to gas fading by incorporating the alkaline salts of the copolymers therein according to this invention does not adversely affect the other properties of the textile materials. Thus, the incorporation of the alkaline salts of the copolymers into the textile materials does not appreciably change the light fastness, wash fastness, resistance to crocking and other similar properties of the said textile materials. The textile materials are also free from any tendency toward yellowing. Surprisingly enough, however, when the textile materials have a base of cellulose acetate or other organic derivative of cellulose, the incorporation of the alkaline salts of the copolymers therein greatly improves the resistance of the said textile materials to delustering. As is well known, delustering is the loss of luster of textile materials when they are subjected to hot aqueous treatments at elevated temperatures. Textile materials prepared in accordance with this invention are highly resistant to delustering during hot aqueous treatments, retaining their original luster substantially unchanged. The said textile materials also show an improved affinity for acetate dyestuffs.

The textile materials prepared in accordance with this invention may have incorporated therein, in addition to the alkaline salts of the copolymers, pigments, dyestuffs, ultra-violet light absorbents and other substances capable of altering the appearance or properties of the final products. These textile materials may be prepared in the form of continuous filaments or in the form of fibers of staple length. They may be employed alone or mixed with other textile materials and converted to fabrics by knitting, weaving or in any other desired manner. Finishes, lubricants, anti-static agents sizes and the like may be applied to the textile materials, and the fabrics prepared therefrom may be aftertreated to alter their hand, appearance, resistance to creasing and other properties.

The following examples are given to illustrate this invention further:

*Example I*

A cellulose acetate yarn containing 5 percent by weight of a copolymer of equimolecular parts of methyl vinyl ether and maleic anhydride of a specific viscosity of 1.2 is knitted into a fabric and dyed with an aqueous dyebath having a pH of 8 and containing 0.3% by weight on the weight of the fabric of a dye of the formula 1-hydroxyethylamine, 4-methylamine anthraquinone (35.4% color), 2 ml./liter of Turkey red oil, 0.5 gram/liter of soap and 0.5 gram/liter of sodium carbonate, washed and dried. The dyed fabric when exposed to 1 unit of gas fading as described in AATCC test procedure 23–52 shows only a slight change in shade whereas a control fabric prepared from cellulose acetate yarns that do not contain the added copolymer shows a marked change under these conditions. With two units of gas fading exposure, the fabric prepared from the copolymer containing yarn shows only a slight change in shade whereas the control fabric shows a severe change in color. With three and also with four units of gas-fading exposure the fabric prepared from the copolymer containing yarn shows only a slight to moderate change in shade.

Dry cleaning or washing the fabric does not alter its response to gas-fading exposure. The dyed fabric prepared from the copolymer containing yarns is equal to the control fabric with regard to light fastness, wash fastness and crocking when tested in accordance with standard AATCC procedures.

The dyed fabric prepared from the copolymer containing yarns retains its luster substantially unchanged after treatment for one hour at 98° C. in an aqueous 1% soap solution whereas the control fabric exhibits a considerable loss of luster when treated in this manner.

*Example II*

A cellulose acetate yarn containing 2 percent by weight of a copolymer of equimolecular parts of methyl vinyl ether and maleic anhydride is knitted into a fabric and dyed in the manner set forth in Example I. The dyed fabric when exposed to one unit of gas fading shows only a slight change in shade. On exposure to two units of gas fading it shows a slight to moderate change in shade, and on exposure to three units of gas fading it shows a moderate change in shade.

Dry cleaning or washing the fabric does not alter its response to gas-fading exposure. The dyed fabric prepared from the copolymer containing yarn is equal to the control fabric with regard to light fastness, wash fastness and crocking.

The dyed fabric prepared from the copolymer containing yarns is highly resistant to delustering when tested in the manner set forth in Example I.

*Example III*

A cellulose acetate yarn containing 5 percent by weight of a copolymer of equimolecular parts of methyl vinyl ether and the mono ethyl ester of maleic acid is knitted into a fabric and dyed in the manner set forth in Example I. The dyed fabric when exposed to one unit of gas fading shows only a slight change in shade. On exposure to two and three units of gas fading it shows a slight to moderate change in shade, and on exposure to four units of gas fading it shows a moderate change in shade.

Dry cleaning or washing the fabric does not alter its response to gas-fading exposure. The dyed fabric prepared from the copolymer containing yarn is equal to the control fabric with regard to light fastness, wash fastness and crocking.

The dyed fabric prepared from the copolymer containing yarn is highly resistant to delustering when tested in the manner set forth in Example I.

*Example IV*

A cellulose acetate yarn containing 5 percent by weight of a copolymer of isobutyl vinyl ether and maleic anhydride is knitted into a fabric and dyed in the manner set forth in Example I. The dyed fabric when exposed to one unit of gas-fading shows only a slight change in shade. On exposure to two units of gas fading it shows a moderate change in shade.

Dry cleaning or washing the fabric does not alter its response to gas-fading exposure. The dyed fabric prepared from the copolymer containing yarn is equal to the control fabric with regard to light fastness, wash fastness and crocking.

The dyed fabric prepared from the copolymer containing yarn is highly resistant to delustering when tested in the manner set forth in Example I.

It is to be understood that the foregoing detailed description is given merely by way of illustration and that many variations may be made therein without departing from the spirit of our invention.

Having described our invention, what we desire to secure by Letters Patent is:

1. A dyed textile material susceptible to gas fading having incorporated therein an uncolored alkaline salt of a copolymer of an alkyl vinyl ether and a member of the group consisting of an ethylenic $\alpha,\beta$ dibasic carboxylic acid, its anhydride and half-ester, said uncolored alkaline salt being the sole reaction product of said copolymer.

2. A dyed textile material susceptible to gas fading having incorporated therein from about 1 to 15% by weight of an uncolored alkaline salt of a copolymer of an alkyl vinyl ether and a member of the group consisting of an ethylenic $\alpha,\beta$ dibasic carboxylic acid, its anhydride and half-ester, said uncolored alkaline salt being the sole reaction product of said copolymer.

3. A dyed textile material of blue color susceptible to gas fading having incorporated therein an anthraquinone dye and an uncolored alkaline salt of a copolymer of an alkyl vinyl ether and a member of the group consisting of an ethylenic $\alpha,\beta$ dibasic carboxylic acid, its anhydride and half-ester, in a sufficient quantity substantially to increase the resistance of said color to gas fading, said uncolored alkaline salt being the sole reaction product of said copolymer.

4. A dyed textile material of blue color of an organic derivative of cellulose selected from the group consisting of cellulose esters and cellulose ethers, said material being susceptible to gas fading and having incorporated therein an anthraquinone dye and from about 1 to 15% by weight of an uncolored alkaline salt of a copolymer of an alkyl vinyl ether and a member of the group consisting of an ethylenic $\alpha,\beta$ dibasic carboxylic acid, its anhydride and half-ester, said uncolored alkaline salt being the sole reaction product of said copolymer.

5. A dyed cellulose acetate textile material of a blue color susceptible to gas fading having incorporated therein and uniformly distributed an anthraquinone dye and from about 1 to 15% by weight of an uncolored alkaline salt of a copolymer of methyl vinyl ether and maleic anhydride, said uncolored alkaline salt being the sole reaction product of said copolymer.

6. A process for improving the gas fading resistance of a dyed textile material subject to gas fading having incorporated therein a copolymer of an alkyl vinyl ether and a member of the group consisting of an ethylenic $\alpha,\beta$ dibasic carboxylic acid, its anhydride and half-ester, which comprises treating said textile material with an alkaline medium to form an uncolored alkaline salt of said copolymer, said alkaline medium being the sole reactant with said copolymer.

7. A process for improving the gas fading resistance of a blue colored textile material of an organic derivative of cellulose selected from the group consisting of cellulose esters and cellulose ethers, said material being susceptible to gas fading and having incorporated therein an anthraquinone dye and a copolymer of an alkyl vinyl ether and a member of the group consisting of an ethylenic $\alpha,\beta$ dibasic carboxylic acid, its anhydride and half-ester, which comprises treating said textile material with an alkaline medium to form an uncolored alkaline salt of said copolymer, said alkaline medium being the sole reactant with said copolymer.

8. A process for improving the gas fading resistance of a dyed cellulose acetate textile material of blue color having incorporated therein an anthraquinone and a copolymer of methyl vinyl ether and maleic anhydride, which comprises treating said textile materials with an alkaline medium having a pH above about 7.5 to form an uncolored alkaline salt of said copolymer, said alkaline medium being the sole reactant with said copolymer.

References Cited in the file of this patent

UNITED STATES PATENTS

| | | |
|---|---|---|
| 1,914,945 | Ellis | June 20, 1933 |
| 2,083,122 | Olpin | June 8, 1937 |
| 2,215,196 | Schlack | Sept. 17, 1940 |
| 2,403,019 | Olpin | July 2, 1946 |

OTHER REFERENCES

Venkataraman: Synthetic Dyes, Academic Press, N.Y., 1952, pp. 641, 642, 1048, 1053.